United States Patent [19]

Schauf

[11] Patent Number: 4,544,588
[45] Date of Patent: Oct. 1, 1985

[54] HOLLOW BODIES OF PLASTIC MATERIALS

[75] Inventor: Dieter Schauf, Leichlingen, Fed. Rep. of Germany

[73] Assignee: Bayer Aktiengesellschaft, Fed. Rep. of Germany

[21] Appl. No.: 593,279

[22] Filed: Mar. 26, 1984

[30] Foreign Application Priority Data

Apr. 5, 1983 [DE] Fed. Rep. of Germany ....... 3312231

[51] Int. Cl.$^4$ ............................................. B65D 3/02
[52] U.S. Cl. ..................................... 428/35; 264/248; 264/263; 156/304.2; 156/304.5; 156/292
[58] Field of Search .................. 428/35; 264/263, 248

[56] References Cited

U.S. PATENT DOCUMENTS

| | | | |
|---|---|---|---|
| 3,893,777 | 7/1975 | Jones | 264/263 |
| 4,038,358 | 7/1977 | Wrasman | 264/263 |
| 4,074,961 | 2/1978 | Reil | 264/263 |
| 4,261,947 | 4/1981 | Ogi | 264/263 |
| 4,263,237 | 4/1981 | Weeden et al. | 264/263 |
| 4,347,208 | 8/1982 | Southall | 264/263 |
| 4,404,053 | 9/1983 | Saffire | 428/35 |
| 4,447,373 | 5/1984 | Chappell et al. | 264/102 |

*Primary Examiner*—Joseph L. Schofer
*Assistant Examiner*—N. Sarofim
*Attorney, Agent, or Firm*—Connolly and Hutz

[57] ABSTRACT

Complicated hollow bodies with undercuts and for multidimensional curves which do not permit the cores to be drawn out of the finished part, are pressed together from prefabricated shells (1) under simultaneously exact pre-shaping and are connected along the joints by injection-moulded plastics material.

6 Claims, 7 Drawing Figures

HOLLOW BODIES OF PLASTIC MATERIALS

The present invention relates to a process for the production of hollow bodies of plastics material which have especially an inner contour which widens at least partially and/or have an axially curved cavity.

Inlet manifolds of Al-alloys are used for engines in the automobile constuction industry, which manifolds could hitherto only be produced by the chill casting process on account of the complicated guiding of the air in the very limited space.

The production of these inlet manifolds is very costly, since new cores have to be produced for each piece which is to be cast and these cores have to be inserted into the hot mould before casting. Moreover the complicated casting moulds place heavy demands on the caster and on the material. The surface of the inner wall of the ducts in particular is often undesirably rough, thus lowering the performance of the engines. Moreover the dimensions of the sealing surfaces which have been cast in the connecting region are not accurate enough, and generally an expensive machining operation has to be subsequently carried out. The casting also often has a porosity which, on account of the intake of secondary air, can give rise to malfunctions in the engine after the casting has been installed. Thus a relatively high reject rate is unavoidable with this mass product, and this necessitates, moreover, an expensive quality control (e.g. each inlet manifolds has to be subjected to hydraulic pressure test).

Furthermore an inlet manifolds composed of plastics material is known, which is injected in one shot, the lost cores consisting of, for example, low melting point bismuth alloys (e.g. 138° C.) or water-soluble salts subsequently being removed.

All plastics-inlet manifolds which are produced with a lost core suffer from the disadvantage that the subsequent removal requires an additional operating cycle in addition to the expensive production and handling of the core. Moreover it is impossible to prevent the most complicated induction pipes composed of strengthened plastics material from drawing due to molecule and fibre orientation, so that conventionally a mechanical aftertreatment has to be performed on the flanges, which is very costly.

An object of the present invention is, therefore, to provide a part of a casting, the inside of which widens away from the inlets and/or bends towards one or more sides, which may be produced in a straight forward manner, has an accuracy of shape in its finished state, a high density, may be favourably produced fluidically with only small material expenditure and nevertheless has a high solidity. This object is achieved, according to the present invention, by pressing together at least two prefabricated shells in a warm condition along the joints to form a hollow body, under simultaneous exact preshaping, which shells are then joined of a plastics material which is added of injection moulding.

The present process enables even complicated plastics hollow bodies, such which possess undercuts in the inner chamber or have axially curved cavities (for example manifolds of automobiles with many bends) to be produced in individual shells, according to processes which have been well tried in commerce, and then to connect these after they have been joined by plastics material which has been melted by injection moulding. By pressing together the shells by applying external forces, the drawing which is readily produced in multidimensional injection moulding parts may firstly be balanced, and secondly the shells may be shaped or subsequently shaped so that the dimensions, necessary for hydraulic or pneumatic reasons, may be met exactly. This advantage is further substantiated by the fact that individual shells having a very smooth surface may be manufactured, and consequently when these are in service there is very little flow resistance and thus a favourable flow is produced. Since the connection consisting of injection moulded plastics material may extend, in a force-locking or form-locking manner, right along one section of or along all of the joint, every specific requirement regarding the strength and tightness can be met economically.

In a specific implementation of the process, the forces for pressing together and shaping in the transistion region are applied to the flanges of the shells and the flanges are at least partially coated with the plastics material which is applied by injection moulding.

By applying the forces to this favourable point in the transition region of the shell and the flange, on the one hand the shape and position of the individual elements to be injection moulded may be adjusted and on the other hand the prominent flanges provide the tool with a suitable attachment point with relatively free shaping of the joint.

In a particular implementation of the process, compound or multiple shells are used, at least several of which are connected by means of plastics material which has been applied by injection moulding to form a hollow body.

The present process enables the most varied wall structures to be produced. Depending on the requirements which must be met in each case, the function and material may be easily adapted without necessitatng considerable additional expenditure, the injection moulding process enabling a rigid connection of the opposite shells as well as the shells which are positioned below each other to be obtained, a connection which may either be carried out in a linear or interrupted manner.

The hollow body which is produced according to the above-mentioned process, is distinguishable in that at least two cavity-forming, aligning shells are connected along the joints by an injection-moulded plastics material.

By means of the plastics material which is applied in the injection moulding process, the shells may be securely connected, in a force-locking and/or form-locking manner, the connection comprising, for example, an air or water-tight joint or even only comprising individual fixing points. Moreover it may be visible or invisible (i.e. between the joint surfaces). Moreover, depending on the requirements, various plastics materials may be used for the shells and the joint.

In a particular embodiment, the shells have flanges, the free edge of which is completely or partially coated with injection-moulded plastics material.

By coating the flanges with injection moulded plastics material (for example of 1–4 mm), a clamp-like attachment is produced, the effect of which may be further improved in particular by an edged beading. A further important advantage is the fact that the mounting flanges for the joints may be simultaneously injection moulded in the same operational stage, the desired parallelism of the plane for the joint being obtained, so that the conventional mechanical aftertreatment which would normally be necessary becomes redundant. Even in the case of thick shells, the connections may be made more secure in the region of the flanges by grooves, projections or seals.

In another embodiment, there is a force locking joint between both flanges, produced by means of injection moulded plastics material at least in the area of the joints.

A force-locking linear or point by point joint may be produced by injecting one or more of the recesses between two opposite flanges.

In one possible embodiment, laminated or composite shells may be at least partially connected together by an injection moulded plastics material.

By arranging several shells in tandem, the specific requirements of the objects for use may sometimes be better taken into account. Thus it is possible to use a non-corrosive substance, such as metal, as an inner shell, while the outer shell consists of a particularly stable plastics material. The shells may also be arranged with a spacing between them, perhaps in order to provide an additional cooling channel. There are many variations on the embodiment, and a seal as well as a fixing can be produced by the injection moulded plastics material.

In a further embodiment the joints of the shells are additionally sealed.

By applying adhesive liquid for solubilization and silicone, the hollow chamber can be made very tight on the connections also against a big pressure difference of gas.

In an embodiment the injection moulded plastics material of various joints may be at least partially connected together.

By injection moulding, for example, a lattice it is possible to partially cancel out with respect to each other the forces of the joints of the flanges and to strengthen the construction of the shells.

The multi-shell construction is particularly suitable for mass construction parts, at a temperature which is suitable for plastics material, which have complicated shapes and have to retain their shape. The substance may be selected according to the requirements of the individual parts which must be met in each case. The following have proved to be particularly effective as materials, especially reinforced with glass-fibre:

| Polyamide | (PA 66-GF) |
| --- | --- |
|  | (PA 6-GF) |
| Unsaturated Polyester | (UP-GF) (SMC- or ZMC-proceeding)* |
| Thermoplastic Polyester | (PBTP-GF) polybutylene terephthalate |
|  | (PETP-GF) polyethylene terephthalate |
| Polyphenylene-sulfide | (PPS-GF). |

*SMC = sheet moulding compound, ZMC = Z moulding compound.

Embodiments of the present invention are shown in the drawings and will now be described in more detail:

Figure 1:
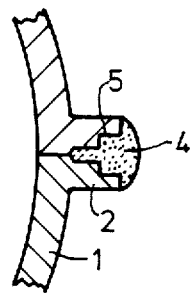
FIG. 1 shows flanges of shells which have a lateral injection moulding joint

FIG. 1 shows two shells 1 which are connected together in a force-locking manner, via flanges 2 in joint 3, by a plastics material 4 which has been produced by injection moulding while melting the plastics material of shell 1, this joint comprising a double-shouldered joint.

Figure 2:
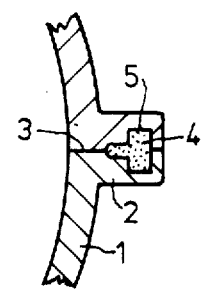
FIG. 2 shows flanges of a shell which have an internal injection moulding joint

FIG. 2 shows shells 1 each of which have a flange 2 along the edge and which are connected to each other by a plastics material 4 which has been forced by injection moulding into recess 5.

Figure 3:
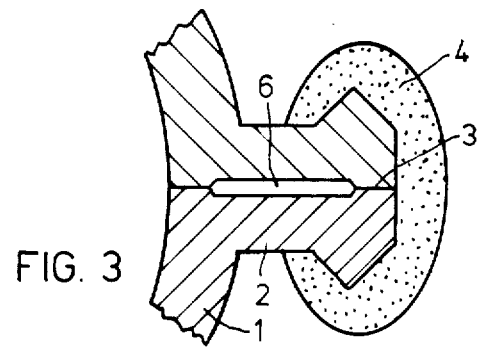
FIG. 3 shows flanges of shells which have a clamp-shaped injection moulding joint

FIG. 3 shows two shells 1 having flanges 2, the outside hook-shaped extended edge of which is surrounding in a clamp-like way by injection moulding a plastics material 4. The gap between plastics material 4 and shell 1 acts as application point for the forces which are applied by a tool, the close fit of joints 3 being facilitated by the surrounding groove 6.

Figure 4:
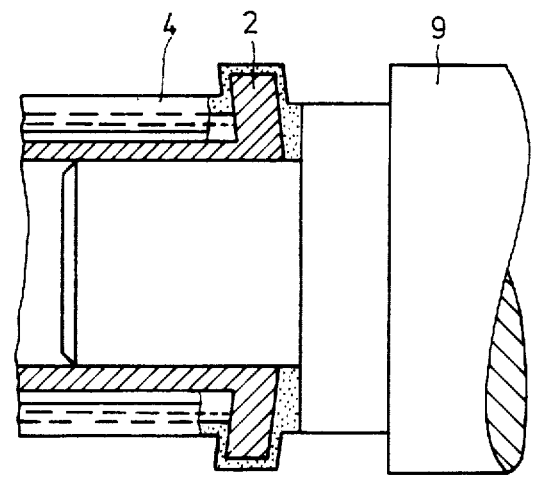
FIG. 4 shows a flange having an injection moulding coating
Figure 5:
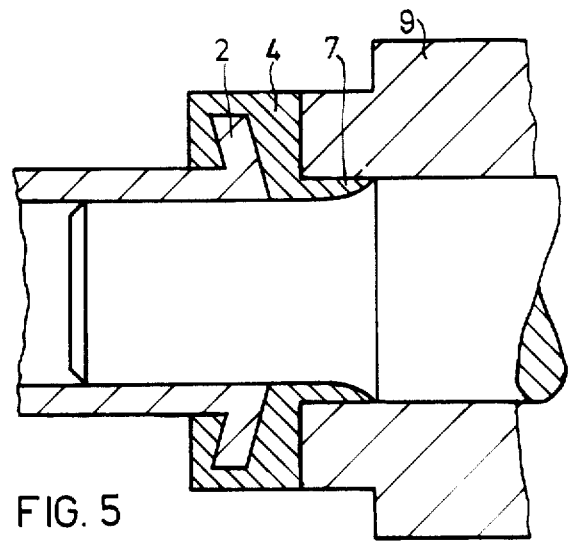
FIG. 5 shows a flange with an injection moulding coating and a tongue
Figure 6:
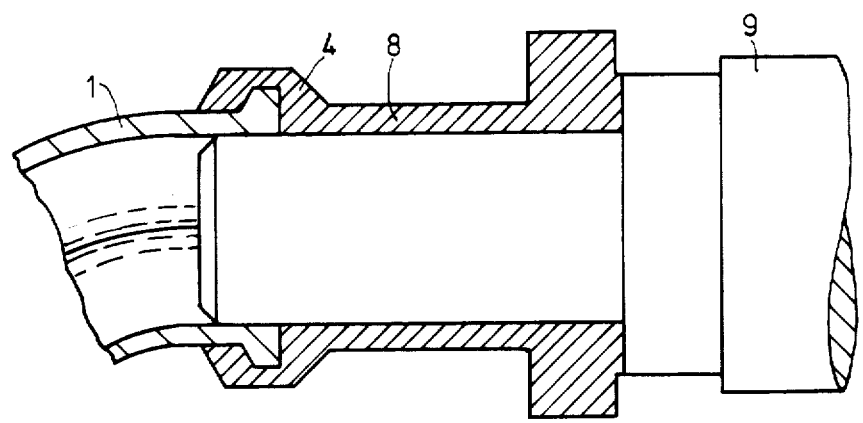
FIG. 6 shows a flange with an extended injection moulding coating

In FIGS. 4 to 6, the flange 2 of shell 1 is shown, which is injection moulded by plastics material, the drawn position of the flange 2 being clearly discernible from the prefabricated part. In FIG. 5 a sealing tongue 7 and in FIG. 6 a transition part 8 are also mounted on simultaneously by injection moulding, the transition part accommodating, moreover, a metal part 9.

Figure 7:
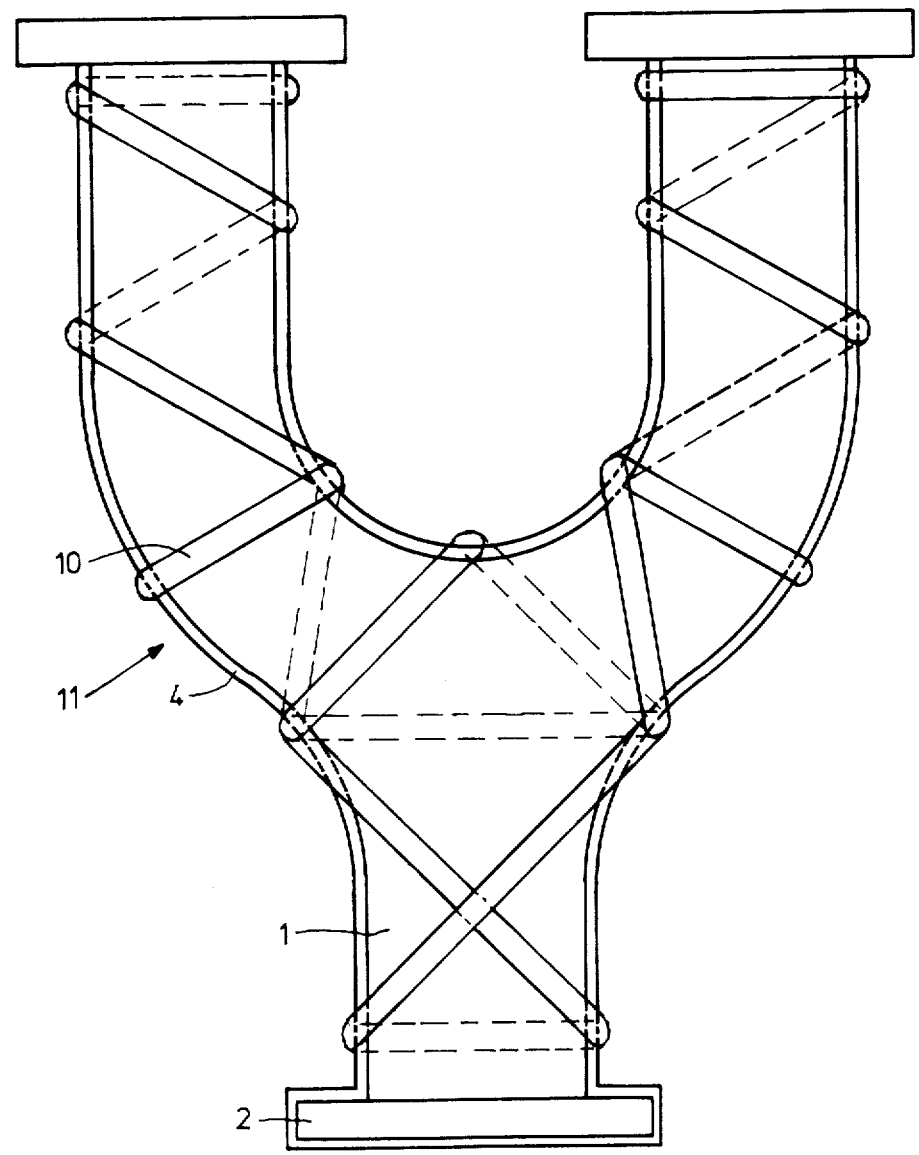
FIG. 7 shows a hollow body with a lattice.

A hollow body 10 is shown in FIG. 7, in which the connections of joints 3 composed of plastics material 4 are connected via a lattice 11 composed of the same plastics material.

I claim:

1. A hollow body of a plastics material having an entrance thereto and an interior contour which widens in an inward direction from the entrance and/or an interior contour having a curved cavity therein, characterized in that the hollow body includes at least two cavity-forming, aligned shells (1) having joint portions (3) connected together by an injection-moulded plastics material (4).

2. A hollow body of a plastics material according to claim 1, characterised in that the shells (1) have flanges (2), the free edges of which are at least partially coated with injected-moulded plastics material (4).

3. A hollow body of plastics material according to claim 1, characterized in that there is a force-locking between both flanges (2) at least in an area of the joint portions (3) by injection-moulded plastics material (4).

4. A hollow body of plastics material according to claim 1, characterised in that laminated or composite shells (1) are at least partially connected to each other by an injection moulded plastics material (4).

5. A hollow body of plastics material according to claim 1, characterised in that the joint portions of the shells are additionally sealed.

6. A hollow body of plastics material according to claim 1, characterised in that the injection moulded plastics material (4) of various joint portions (3) is at least partially interconnected.

* * * * *